US011045986B2

(12) United States Patent
Armbruster

(10) Patent No.: US 11,045,986 B2
(45) Date of Patent: Jun. 29, 2021

(54) INJECTION MOULDING DEVICE FOR PRODUCING PARTS MADE OF PLASTIC

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (DE)

( * ) Notice: Subject to any disclaimer, the term of this patent is extended or adjusted under 35 U.S.C. 154(b) by 112 days.

(21) Appl. No.: 15/549,035

(22) PCT Filed: Jan. 20, 2016

(86) PCT No.: PCT/EP2016/051048
§ 371 (c)(1),
(2) Date: Aug. 4, 2017

(87) PCT Pub. No.: WO2016/124396
PCT Pub. Date: Aug. 11, 2016

(65) Prior Publication Data
US 2018/0021999 A1    Jan. 25, 2018

(30) Foreign Application Priority Data
Feb. 5, 2015   (CH) .................................. 00150/15

(51) Int. Cl.
*B29C 45/16*   (2006.01)
*B29C 45/42*   (2006.01)
(Continued)

(52) U.S. Cl.
CPC ...... *B29C 45/1628* (2013.01); *B29C 45/1618* (2013.01); *B29C 45/4225* (2013.01);
(Continued)

(58) Field of Classification Search
CPC ............ B29C 45/1618; B29C 45/1628; B29C 45/4225; B29C 45/7626; B29C 2045/7633
See application file for complete search history.

(56) References Cited

U.S. PATENT DOCUMENTS 4,472,131 A *  9/1984  Ryder ..................... B29C 35/16
                                              264/237
4,836,767 A    6/1989  Schad et al.
(Continued)

FOREIGN PATENT DOCUMENTS

CH           705 721 A2    5/2013
DE    10 2006 007 639 A1   8/2007
(Continued)

*Primary Examiner* — Anthony Calandra
*Assistant Examiner* — Eric T Chen
(74) *Attorney, Agent, or Firm* — Pauley Erickson & Swanson

(57) ABSTRACT

An injection molding device (1) for producing plastic parts (2) consisting of one or more material components is provided. The injection molding device (1) comprises an injection mold (3) having a center part (5) that is rotatable about a first axis of rotation (4), which center part is arranged between a first and a second mold half and which can be moved relative to said mold halves in a first direction. The center part (5) has cavities (7) on the lateral surfaces (6). A retaining device (10) is used to retain the center part (5) in the injection molding device (1). A transfer device (16) is arranged laterally next to the center part (5) at least in an open position and is used to transfer plastic parts (2) into a storage means (28).

17 Claims, 3 Drawing Sheets

(51) Int. Cl.
  *B29C 45/76* (2006.01)
  *B29C 45/72* (2006.01)
  *B29K 105/00* (2006.01)

(52) U.S. Cl.
  CPC .. *B29C 45/7686* (2013.01); *B29C 2045/1626* (2013.01); *B29C 2045/7228* (2013.01); *B29K 2105/253* (2013.01)

(56) References Cited

U.S. PATENT DOCUMENTS

| | | | | |
|---|---|---|---|---|
| 6,143,225 | A | * | 11/2000 | Domodossola ....... B29C 45/045 264/237 |
| 2002/0074676 | A1 | * | 6/2002 | Kachnic .............. B29C 45/7626 264/40.1 |
| 2008/0258353 | A1 | | 10/2008 | Hutchinson et al. |
| 2008/0296801 | A1 | * | 12/2008 | Zoppas ............... B29C 45/4225 264/237 |
| 2009/0065973 | A1 | * | 3/2009 | Jung .................. B29C 45/1615 264/254 |
| 2012/0088000 | A1 | * | 4/2012 | Armbruster ........... B29C 45/006 425/135 |

FOREIGN PATENT DOCUMENTS

| | | |
|---|---|---|
| DE | 10 2014 205 442 A1 | 9/2014 |
| EP | 0 592 021 A1 | 4/1994 |
| WO | WO 2009/080827 A2 | 7/2009 |
| WO | WO 2010/128072 A1 | 11/2010 |

\* cited by examiner

INJECTION MOULDING DEVICE FOR PRODUCING PARTS MADE OF PLASTIC

BACKGROUND OF THE INVENTION

Field of the Invention

The invention relates to a device for the production of parts made of a plurality of plastic components, in particular multilayer preforms, as well as a handling device for the same.

Discussion of Related Art

Injection molding devices for the production of single and multi-layer preforms, as well as cooling devices for cooling the same, are known from the prior art. Because the preforms are thick-walled and therefore require a comparatively long time until they are sufficiently cooled, on the one hand, and because, on the other hand, high dimensional stability is required in certain areas, special cooling and handling devices are used to cool the preforms from an injection molding device.

U.S. Pat. No. 4,836,767 was published in 1989 of behalf of the Husky corporation. US'767 relates to a device which is used for the simultaneous production and cooling of plastic parts. A carrier plate, which is part of the injection mold, is rotatably arranged about an axis of rotation which is able to rotate parallel to the longitudinal axis of the device. It serves the purpose of removing the parts from the injection molding device and transferring them to a cube-shaped cooling device which is able to rotate about a horizontal axis of rotation. The parts, once produced, are transferred from the cooling device to a conveyor belt, which is arranged below the cooling device.

EP0592021 was published in 1994 on behalf of Inter Tooling Services BV. EP'021 relates to an injection molding device, as well as a dispensing device and a robotic device. The dispensing device comprises a so-called turret head, to which receiving plates are attached. These serve to receive the injected parts. As soon as a receiving plate of the robotic device is filled with newly cast products, the plate makes a linear movement from the position between the mold halves to the rest position. One problem is that the entire dispensing device enters the injection mold, which presents a high risk of damage.

DE102014205442A1 was published in 2014 on behalf of Otto Männer Innovation GmbH. DE'442 relates to a device for tempering of the neck closure area of preforms. The device comprises tempering inserts corresponding in shape to the threaded neck closure of the preforms. The tempering inserts are coupled to a take-off plate, take-off frame, or similar conveying means which receives freshly cast preforms indirectly or directly from the injection molding cores used for preparing the preforms. The tempering inserts can cool or heat the neck closure. These tempering inserts are connected to cooling tubes or to cooling cores which are arranged outside the injection mold cavities, and which serve to cool the remaining region of the preform which has no thread. The tempering inserts can be connected to an ejection mechanism.

DE102006007639A1 was published in 2007 on behalf of MH Mold & Hotrunner Technology AG. DE'639 relates to a system for the post-treatment of preforms. The system has receiving fingers which can reach into the preforms. The receiving fingers are attached to the sides of a cube which is arranged to rotate about an axis. The preforms are transferred to the receiving fingers by means of a take-off plate, which enters laterally into an injection mold. One problem is that the system has a comparatively complex design.

SUMMARY OF THE INVENTION

A problem addressed by the invention is that of demonstrating a device for producing plastic parts which has a simpler and more efficient design compared to the prior art. This problem is addressed by the invention as defined in the claims.

In one embodiment, the invention comprises an injection molding device for producing plastic parts made of one or more material components. The injection molding device has an injection mold with a central part which is able to rotate about a first axis of rotation, arranged between a first and a second mold half and displaceable relative thereto in a first direction. The central part has at least one pair of lateral surfaces, which are opposite one another with respect to the first axis of rotation, said pair forming, in a closed position, cavities together with the first and the second mold halves. A retaining device is used to hold the central part with respect to the first and second mold halves. Furthermore, a transfer device is included, which is arranged laterally adjacent to the central part, at least when in an open position, and which serves to accept plastic parts adhering to a lateral surface of the central part facing the same in this position. The transfer device is advantageously attached to the retaining device of the central part. As a rule, it has a base which can be displaced with respect to the retaining device, as well as a storage means which is able to rotate about a second axis relative to the base. The first and second axes of rotation are advantageously arranged parallel to each other. Depending on the embodiment, however, they can also be arranged at a right angle to one another. In the closed position, liquid plastic is injected into the cavities of the injection molding device in multiple steps/layers to produce the parts. For example, sub-regions of the plastic parts to be produced are produced in the cavities between the central part and the first mold half. Subsequently, the injection mold is opened by the relative displacement of the first and second mold halves with respect to the central part, and the central part is then rotated with the sub-regions adhering thereto around the first axis of rotation until the sub-regions are arranged between the central part and the second mold half. Subsequently, the injection mold is closed again and the same, or a second, material component is injected onto the first sub-region. Next, the injection mold is opened again and the central part is rotated by a further 90° so that the parts come to lie opposite the transfer device, which takes them off.

The storage means serves to transfer and store plastic parts from the cavities of the central part. Depending on the design and intended application, the removed plastic parts are subjected to a further processing step in the storage means, and then ejected and/or returned to the central part of the injection mold. For example, the plastic parts are cooled and/or subjected to a (visual) inspection and/or a test (e.g. a tightness test). The transfer device is advantageously attached to the retaining device of the central part by means of a stand. Other types of attachment are possible. In a preferred embodiment, the transfer device is fastened to an upper crossmember of the retaining device of the central part. Further aspects of the retaining device are found in the following description of the embodiments. The retaining means are advantageously distributed over the circumference of the storage means, which is generally arranged to be able to rotate about a second axis. The arrangement of the retaining means corresponds at least to the arrangement of the cavities of a lateral surface of the central part, such that the plastic parts can be removed. In a preferred embodiment, the storage means is arranged below the base. This has the advantage that the plastic parts can fall downwards out of the device unimpeded. In one embodiment, the storage means has bell-shaped retaining means which serve to receive the plastic parts. For this purpose, they have cavities corresponding to the plastic parts. For the purpose of cooling or heating, the retaining means can have channels through which appropriately heated or cooled liquids can be conveyed. The retaining means can have an opening for applying a negative pressure and/or an overpressure, such that the plastic parts can adhere to or can be ejected from the retaining means. In a preferred embodiment, grippers are arranged on the side of the storage means which is opposite the central part, and are suitable for gripping plastic parts adhering to the storage means. The grippers can also be attached to the stand. Alternatively or in addition thereto, the grippers can be attached to an external, stationary device. A disadvantage is that these cannot be easily moved along with the central part. The grippers can be used for the controlled ejection of the plastic parts from the injection molding device. Sensors which serve the purpose of inspecting the plastic parts can be arranged in the region of the retaining means—that is, outside and/or inside the retaining means. Instead of the removal by the grippers, the produced plastic parts can also be transferred to a further device, for example a further injection molding device.

BRIEF DESCRIPTION OF SEVERAL VIEWS OF THE DRAWINGS

Aspects of the invention are explained in more detail with reference to the exemplary embodiments shown in the following figures and the corresponding description, wherein.

DETAILED DESCRIPTION OF THE INVENTION

Figure 1:
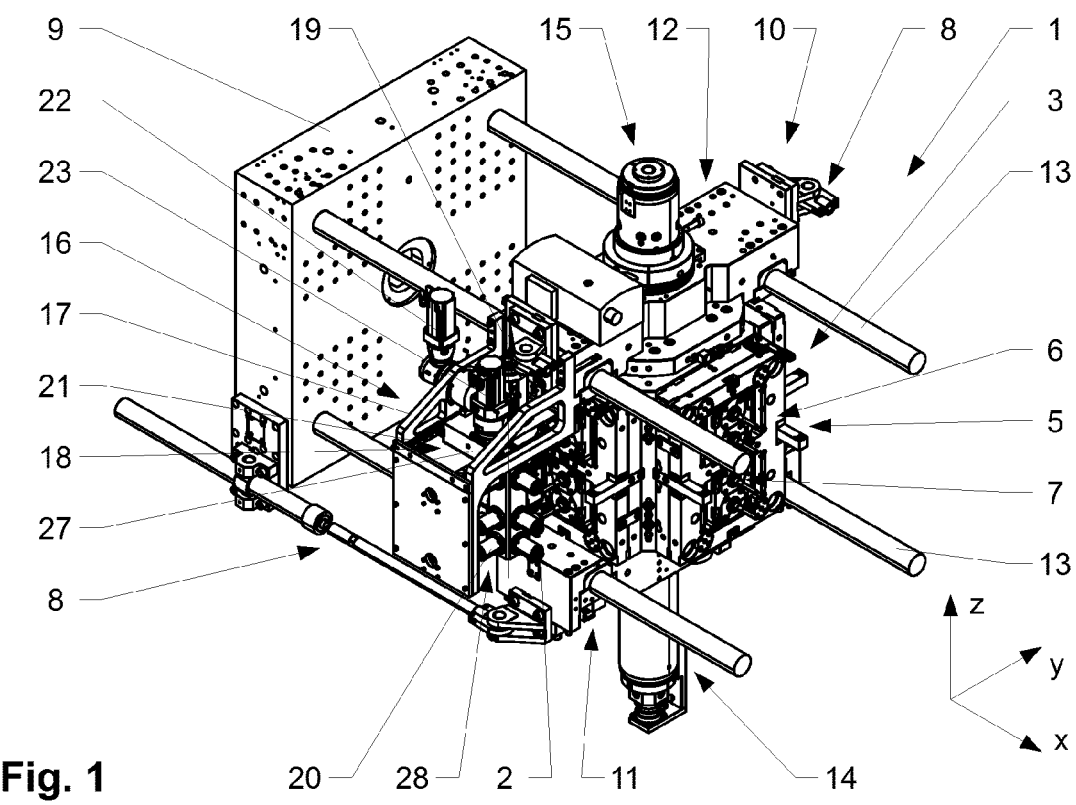
FIG. 1 shows an embodiment of the invention in a perspective frontal view from obliquely above.

FIG. 1 shows an embodiment of a device 1 for the production of plastic parts 2 (see FIG. 5) made of one or more material components. The plastic parts 2 to be produced can, for example, be constructed of one or more layers. In the embodiment shown, the device 1 is used for the production of preforms 2 for the manufacture of PET bottles by blow molding.

The device 1 has an injection mold 3, which is only partially shown here. The injection mold 3 has a central part 5, which is able to rotate about a first axis of rotation 4, which is arranged between a first and a second half of the mold (not shown in detail), and which has at least one pair of lateral surfaces 6 opposite one another with respect to the first axis of rotation 4 of the central part 5. In the embodiment shown, the central part 5 has four lateral surfaces 6, wherein each pair of opposing lateral surfaces 6 are associated with each other. In a closed position (not shown), the lateral surfaces 6, together with the first and the second mold halves, form first and second mold chambers respectively cavities 7 which are suitable for molding the plastic parts 2 in one or more steps by receiving molten plastic. The nozzle side of the injection mold 3 is normally located in the first and the second outermost mold halves. The so-called core sides are arranged on the central part 5.

Figure 2:
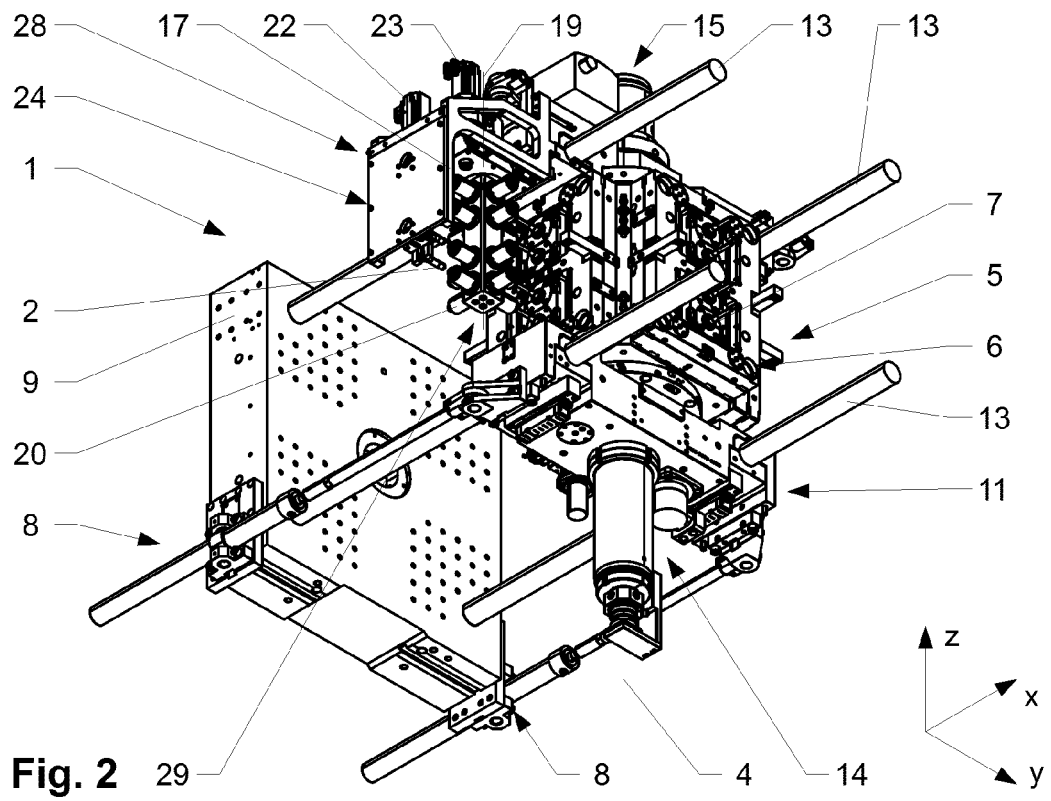
FIG. 2 shows the embodiment according to FIG. 1 in a perspective frontal view from obliquely below.

In the embodiment shown, the central part 5 is fastened to a retaining device 10, which has a lower and an upper crossmember 11, 12 which are arranged on the beams 13 of an injection molding device (not shown in detail) in a manner allowing linear movement along the latter in a first direction. In order to allow the central part 5 to be arranged centrally between the first and second mold halves during the opening and closing of the injection mold 3, a hydraulic linear drive 8 is included in this case, (depending on the intended application and design, other drives are possible), that functionally connects the central part 5 respectively its retaining device 10 with one or both mold clamping plates 9. The linear drive 8 causes the central part 5 to be arranged at the center between the first and the second half of the mold (not shown) during opening and closing, at least in the fully open position, such that the central part 5 can be rotated unimpeded around the first axis of rotation 4. In the embodiment shown, the linear drive 8 is a total of four hydraulic cylinders 9, of which, however, only the lower two are shown in FIGS. 1 and 2. Depending on the intended application, the retaining device 10 can consist of only the lower cross member or only the upper cross member 11, 12, or of a combination thereof. As an alternative or in addition thereto, the lower crossmember 11 can be mounted on a machine base (likewise not shown) of the injection molding device. In this case, a connection to the beams 13 is not absolutely necessary. The crossmembers 11, 12 each have a (lower respectively upper) rotation unit 14, 15 between which the central part 5 is arranged in a manner allowing rotation about the first axis of rotation 4.

In the embodiment shown, a transfer device 16 is fastened to the upper crossmember 12. Alternatively or in addition thereto, the transfer device 16 can also be arranged on the lower crossmember 11 or on an external retaining device (stationary with respect to the longitudinal axis of the device). The transfer device 16 comprises a stand 17, as well as a transfer module 18 attached thereto, which can be moved linearly in the transverse direction (the y-direction) with respect to the stand 17 and/or the central part 5. The transfer module 18 has a base 27 and a storage means 28 which is arranged to be able to rotate with respect to the latter about a second axis of rotation 19. This has retaining means 20 which are distributed over the circumference thereof, and which serve to temporarily receive and hold the plastic parts 2 from the central part 5. In the embodiment shown, the storage means 28 is suspended below the base 27. For the transfer of media, such as water and/or air and/or oil, between the base 27 and the storage means 28, coaxial channels (not shown) can be advantageously arranged in the interior of the base. These serve the purpose of exchanging media between the non-rotating base and the rotating storage means 28. Linear guiding means 21 ensure the ability to move between the stand 17 and the transfer module 18. A first drive 22 forms a functional connection between the stand 17 and the base 27 and serves the purpose of moving the transfer device 16 with respect to the stand 17 and/or relative to the central part 5 of the injection mold 3. A second drive 23 forms a functional connection between the base 27 and the storage means 28 and serves the purpose of rotating the storage means 28 with respect to the base 27 about the second axis of rotation 19. The retaining means 20 serve the purpose of accepting and/or temporarily holding the plastic parts 2. The plastic parts 2 are taken out of the cavities 7 of a lateral surface 6, facing the same, of the central part 5. If necessary, the plastic parts 2, before being transferred by the retaining means 20—facing the same in the corresponding processing step—of the transfer module 18, can be released for smooth transfer by means of a release mechanism (not shown in detail), which is normally arranged in the interior of the central part 5.

Grippers 24 are arranged on the side of the transfer module 18 which is opposite the central part 5. In a further processing step, these serve to accept the plastic parts 2 from the retaining means 20 of the transfer module 18. In the embodiment shown, the grippers 24 are also attached to the stand 17, but can also be mounted externally if needed—for example on the injection molding device, or outside of the same in a stationary position. The transfer module 18 with the plastic parts 2 adhering thereto is moved along the linear guiding means 21 into the effective range of the grippers 24 for the transfer, such that the grippers 24 can grip the plastic parts 2 and thus accept them from the transfer module 18. In the embodiment variant shown, the grippers 24 are then opened, such that the plastic parts 2 fall downwards out of the device 1.

In the embodiment variant shown, the transfer module 18 has a number of retaining means 20 corresponding to the number of cavities 7 of the central part 5. However, depending on the intended application, the number may be higher or lower, provided that the number corresponds for each facing surface. For example, the central part 5 can have four lateral surfaces 6 with cavities, wherein the storage means 28 has only two sides with retaining means 20. In this case, it is necessary for the storage means 20 to rotate about the second axis of rotation 19 twice as fast as the center part 5 rotates about the first axis of rotation 4. The central part 5 can also be equipped with cavities 7 on only two lateral surfaces 6, and the storage means 28 on four surfaces. In this case, the storage means 28 accordingly rotates more slowly. Other arrangements are possible as required.

While the plastic parts 2 are held by the retaining means 20 of the storage means 28, they can be subjected to a further processing step. In the embodiment shown, the holding means 9 serve the purpose of cooling the plastic parts 2. This has the advantage that even thick-walled plastic parts 2, which have a long cooling time, can be taken from the central part 5 more quickly as compared to the prior art, without the need to disadvantageously throttle the production speed of the injection mold 3. Because the transfer device 16 is arranged laterally adjacent to the central part 5 and is moved together with the same along the beams 13, the transfer of the plastic parts 2 from the central part 5 to the transfer device 16 is not bound to a specific longitudinal position of the central part 5—and can therefore occur at any time.

In order to be able to cool the plastic parts 2 efficiently and gently, the retaining means 20 have a preferably bell-shaped design with a cavity 25, such that the plastic parts 2 can be accommodated in the interior. The bell-shaped design achieves a greatest possible contact area, which ensures particularly efficient cooling compared to the prior art. An advantage of the device according to the invention is that it has a comparatively small size, and therefore has a small footprint. Furthermore, it is robust and low-maintenance in operation. Further details are given in the following description.

Figure 3:
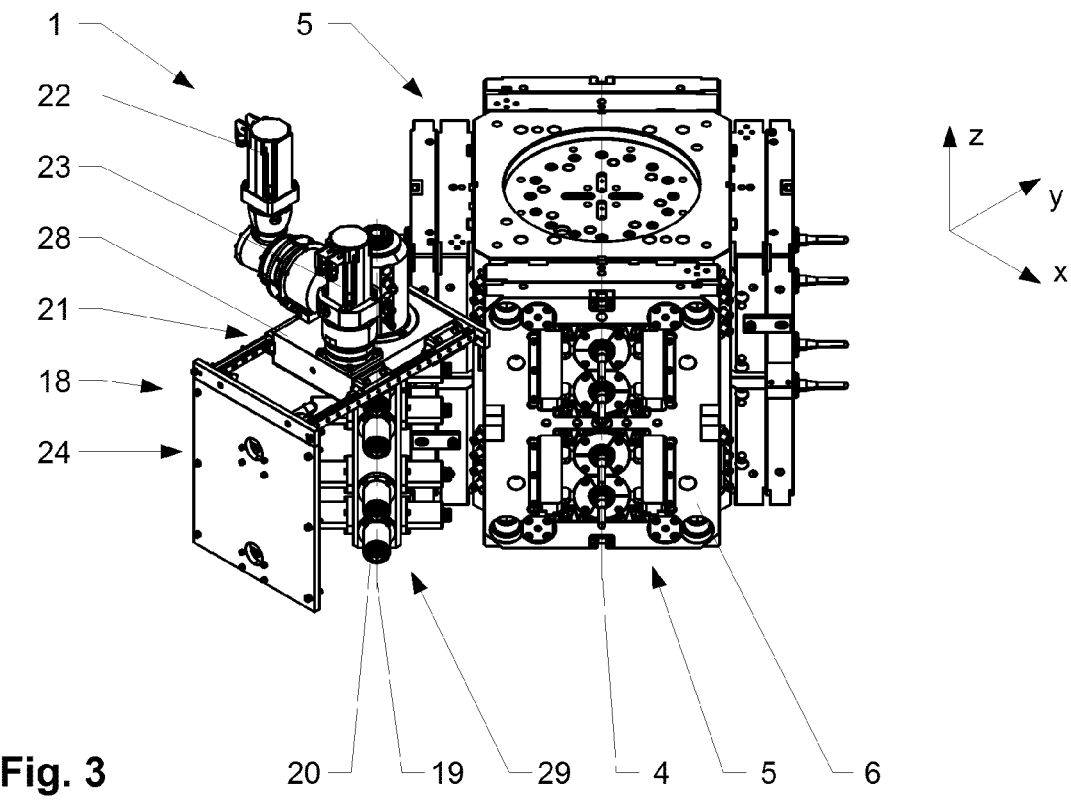
FIG. 3 shows the embodiment according to FIG. 1 limited to essential parts, in a perspective frontal view from obliquely above.
Figure 4:
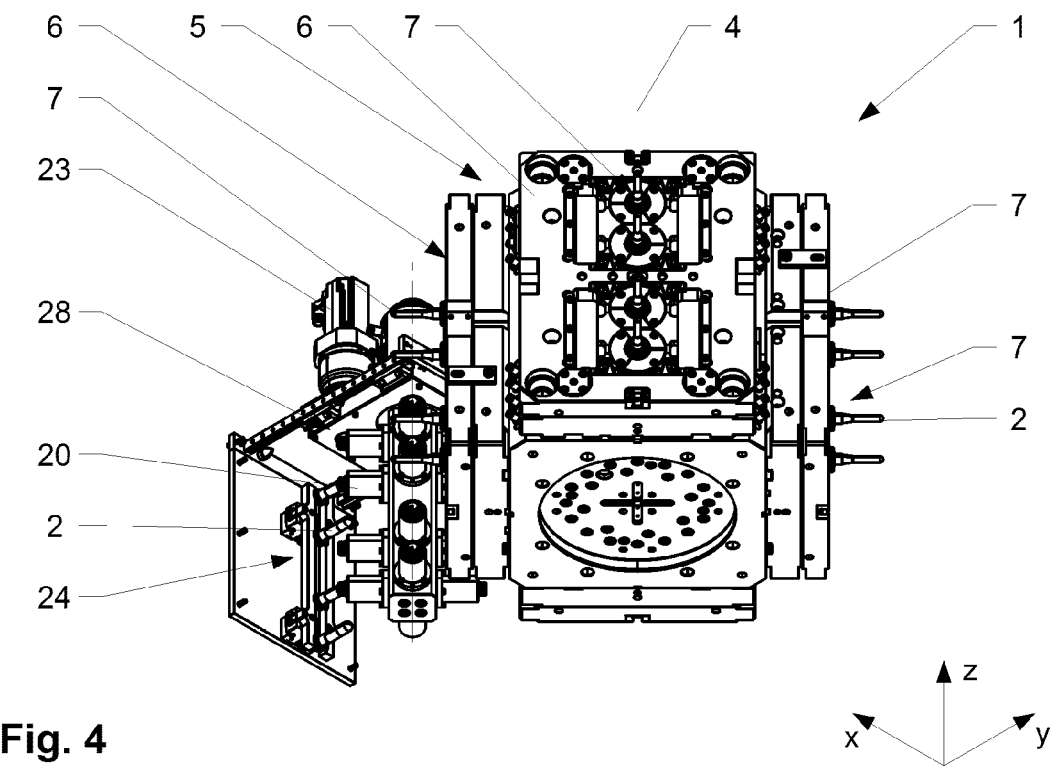
FIG. 4 shows the embodiment according to FIG. 3 in a perspective frontal view from obliquely below.

FIGS. 3 and 4 show the device 1 according to FIGS. 1 and 2, without the injection molding device. Only the rotatable central part 5 of the injection mold can be seen. The linear guiding means 21, the grippers 24, the base 28 and the storage means 29 can be recognized in the transfer device 16. Both the central part 5 and the storage means 29 are shown in an intermediate position (rotated 45° about their respective axes of rotation 4, 19).

In operation, the transfer device 16 oscillates back and forth between the facing lateral surface 6 of the central part 5 and the grippers 24. The storage means 29, which is used to temporarily accept and store the first plastic parts 2, rotates in a clocked manner around the second axis of rotation 19 in this case. The retaining means 20 are moved by displacing the base 28 along the linear guiding means 21 until the plastic parts 2 can be removed from the cavities 7. For this purpose, the retaining means 20 are arranged corresponding to the cavities. If necessary, the retaining means 20 can also be arranged to move relative to one another.

Figure 5:
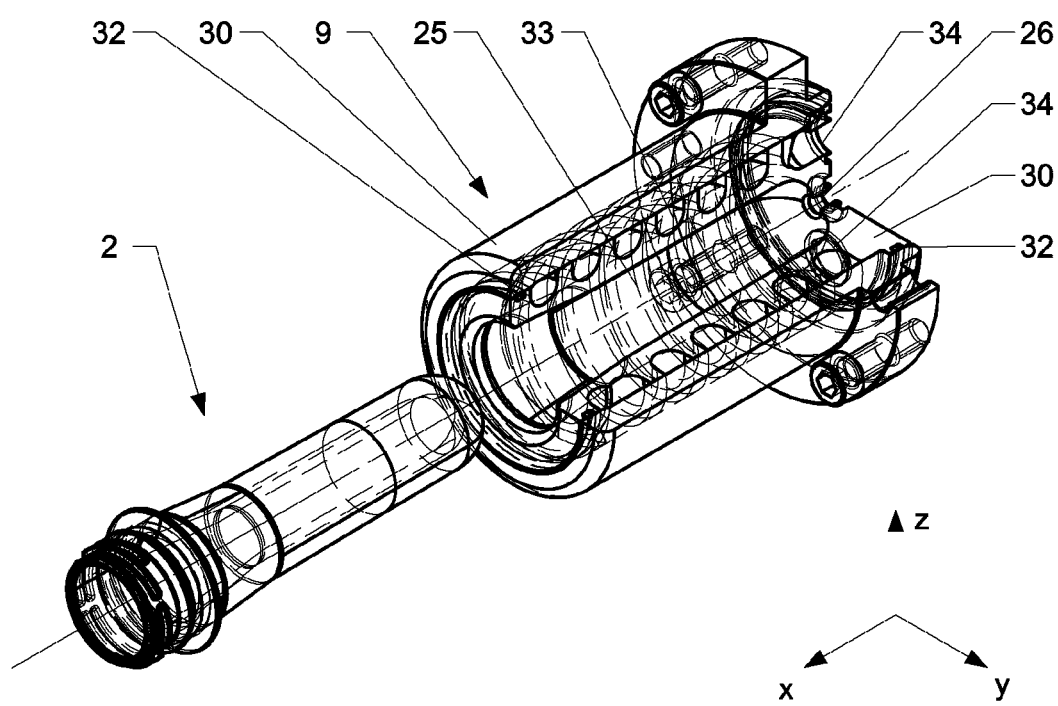
FIG. 5 shows a plastic part, as well as a retaining means for such a part.

FIG. 5 shows a retaining means 20 in a sectional view, such that the interior can be better seen. The hidden lines are shown as dashes to better illustrate the design. The cavity 25 is adapted to the outer contour of the plastic part 2. An opening 26 can be seen at the bottom of the cavity 25, by means of which a vacuum can be applied, such that the plastic parts 2 can be held securely and gently inside the cavity 25 of the retaining means 20. With the application of an overpressure, the plastic parts 2 can be ejected from the cavity 25. Depending on the intended application and configuration, the retaining means 20 can have a different design. Alternatively or in addition thereto, the holding force can be generated by frictional engagement—for example by the inclusion of an element in the interior of the cavity 25 which increases friction. Good results can be achieved with sealing elements embedded in a groove. However, it should be noted that this type of force generation is only possible if the plastic parts are already cured to a certain extent. In the case of plastic parts which have not yet sufficiently hardened, this can lead to damage on the surface. As can be seen, the retaining means 20 in this case has a helical, double-walled cooling channel 33 which is supplied with cooling liquid through two openings 34 in the region of the base of the retaining means 20. In the embodiment shown, the retaining means comprises an inner and an outer housing 30, 31, which are slid coaxially over each other and sealed off from each other by means of seals 32. The cooling channel 27 is arranged between the two housings 30, 31.

The invention claimed is:

1. An injection molding device for the production of plastic parts made of one or more material components, comprising:
    a. an injection mold with a central part, which can be rotated about a first axis of rotation, arranged between a first mold half and a second mold half and which can be displaced relative thereto in a first direction, and with at least two lateral surfaces opposite one another about the first axis of rotation of the central part, which in a closed position form cavities together simultaneously with the first mold half and the second mold half;
    b. a retaining device which holds the central part relative to the first mold half and the second mold half, and
    c. a transfer device which is arranged, at least in an open position, to a side of the central part, and accepts plastic parts adhering to a lateral surface, facing the lateral surface in this position, of the central part, d. wherein the transfer device is attached to the retaining device of the central part and comprises a base which can be displaced with respect to the retaining device, as well as a storage means which rotates relative to the base about a second axis parallel to the first axis and is configured to temporarily accept and store plastic parts from cavities of the central part and then to return the plastic parts to the central part, and wherein retaining means are distributed over a circumference of the storage means, and e. wherein each of the first axis and the second axis is vertical and perpendicular to the first direction of the displaced first mold half and second mold half.

2. The injection molding device according to claim 1, wherein the transfer device is attached to the retaining device of the central part with a stand.

3. The injection molding device according to claim 2, wherein the transfer device is attached to an upper cross-member of the retaining device of the central part.

4. The injection molding device according to claim 1, wherein an arrangement of the retaining means corresponds to an arrangement of the cavities of a lateral surface of the central part.

5. The injection molding device according to claim 1, wherein the storage means is suspended below the base.

6. The injection molding device according to claim 1, wherein the storage means comprises bell-shaped retaining means which receive the plastic parts.

7. The injection molding device according to claim 6, wherein the retaining means include an opening for applying a vacuum and/or an overpressure.

8. The injection molding device according to claim 2, wherein grippers suitable for gripping plastic parts adhering to the storage means are arranged on the side of the storage means opposite the central part.

9. The injection molding device according to claim 8, wherein the grippers are fastened to the stand.

10. The injection molding device according to claim 8, wherein the grippers eject the plastic parts from the injection molding device.

11. The injection molding device according to claim 1, wherein sensors which inspect the plastic parts are arranged in the region of the retaining means.

12. The injection molding device according to claim 1, wherein the storage means moves in a second direction relative to the central part that is perpendicular to the first direction, and the storage means is configured to release the plastic parts in the second direction by overpressure or a gripper, whereby the plastic parts then fall downwards in a third direction perpendicular to both the first direction and the second direction and out of the injection molding device.

13. An injection molding device for the production of plastic parts made of one or more material components, comprising:

an injection mold with a central part, which can be rotated about a first axis of rotation, arranged between a first mold half and a second mold half and which can be displaced relative thereto in a first direction, and with at least two lateral surfaces opposite one another about the first axis of rotation of the central part, which in a closed position form cavities together simultaneously with the first mold half and the second mold half;

a retaining device which holds the central part relative to the first mold half and the second mold half, a transfer device which is arranged, at least in an open position, to a side of the central part, and accepts plastic parts adhering to a lateral surface, facing the lateral surface in this position, of the central part, wherein the transfer device is attached to the retaining device of the central part and comprises a base which can be displaced with respect to the retaining device, as well as a storage means which rotates relative to the base about a second axis parallel to the first axis and configured to temporarily accept and store plastic parts from cavities of the central part, wherein each of the first axis and the second axis is vertical and perpendicular to the first direction of the displaced first mold half and second mold half, and wherein retaining means are distributed over a circumference of the storage means, and grippers arranged on a side of the storage means opposite the central part, and configured to grip and eject plastic parts adhering to the storage means, wherein the storage means rotates about the second axis to orient the plastic parts facing toward the grippers.

14. The injection molding device according to claim 13, wherein the storage means is configured to both eject the plastic parts via the grippers and return the plastic parts to the central part of the injection mold.

15. The injection molding device according to claim 13, wherein the storage means moves in a second direction that is perpendicular to the first direction, and between the central part and the grippers.

16. The injection molding device according to claim 15, wherein each of the first axis and the second axis is vertical and perpendicular to each of the first direction and the second direction.

17. The injection molding device according to claim 15, wherein the grippers open to release the plastic parts downwards in a third direction perpendicular to the second direction and out of the injection molding device.

* * * * *